United States Patent
Iannace et al.

(10) Patent No.: US 8,124,662 B2
(45) Date of Patent: Feb. 28, 2012

(54) FOAMED POLYMER-INORGANIC BINDER HYBRID MATERIAL HAVING CONTROLLED DENSITY AND MORPHOLOGY, METHOD FOR ITS PREPARATION AND USES THEREOF

(75) Inventors: Salvatore Iannace, Naples (IT); Ernesto Di Maio, Caserta (IT); Letizia Verdolotti, Maddaloni (IT); Marino Lavorgna, Puglianello (IT)

(73) Assignee: Consiglio Nazionale Delle Ricerche (CNR), Rome (IT)

( * ) Notice: Subject to any disclaimer, the term of this patent is extended or adjusted under 35 U.S.C. 154(b) by 374 days.

(21) Appl. No.: 12/306,236

(22) PCT Filed: Jul. 4, 2007

(86) PCT No.: PCT/IB2007/001842
§ 371 (c)(1),
(2), (4) Date: Dec. 22, 2008

(87) PCT Pub. No.: WO2008/007187
PCT Pub. Date: Jan. 17, 2008

(65) Prior Publication Data
US 2009/0326085 A1    Dec. 31, 2009

(30) Foreign Application Priority Data
Jul. 7, 2006 (IT) .............................. MI2006A1325

(51) Int. Cl.
*C08J 9/00* (2006.01)
*C08G 18/08* (2006.01)
(52) U.S. Cl. .......................... 521/85; 521/155; 521/159
(58) Field of Classification Search .................... 521/83, 521/155, 159
See application file for complete search history.

(56) References Cited

U.S. PATENT DOCUMENTS
4,129,696 A    12/1978    Markusch et al.
6,313,186 B1    11/2001    Kaida et al.

FOREIGN PATENT DOCUMENTS
EP    0 853 073 A1    7/1998
GB    1 549 699 A    8/1979
GB    1549699 A  *  8/1979

* cited by examiner

*Primary Examiner* — Timothy J. Kugel
(74) *Attorney, Agent, or Firm* — Pearne & Gordon LLP (57) ABSTRACT

The subject of the present invention is a foamed polymer-inorganic binder hybrid material having controlled density and morphology, in particular a foamed polyurethane-inorganic binder hybrid, a method for the preparation of the same and its uses.
Said material has high characteristics of thermal and acoustic insulation, water vapor permeability, fire resistance, lightness, as well as a good adhesiveness to concretes, mortars and plasters and a good compression resistance.

23 Claims, 3 Drawing Sheets

FOAMED POLYMER-INORGANIC BINDER HYBRID MATERIAL HAVING CONTROLLED DENSITY AND MORPHOLOGY, METHOD FOR ITS PREPARATION AND USES THEREOF

The subject of the present invention is a foamed polymer-inorganic binder hybrid material having controlled density and morphology, in particular a hybrid foamed polyurethane-inorganic binder, a method for the preparation of the same and its uses.

Said material has high features of thermal and acoustic insulation, water vapor permeability, fire resistance, lightness as well as a good adhesiveness to concretes, mortars and plasters and a good mechanical resistance to compression, which make the same advantageously utilizable in the building field.

Polyurethane foams (polymeric materials incorporating gas within their structure, referred to, hereinafter, by the general term "foamed polyurethane") are widely used in the building field (in particular, civil-housing building), as they show excellent characteristics of acoustic and thermal insulation, good resilience (namely, the ability of withstanding to dynamic deformations and/or breakings) and low density. However, the mechanical resistance and stiffness properties of said polymeric materials are not satisfactory for structural-type applications.

For the purpose of improving the above properties, within the foamed polyurethane inorganic fillers have been introduced/charged, with a filling function; the presence of these additives has allowed, from one side, to increase the material stiffness, from the other side has however modified the morphology of the same and, accordingly, also the end properties of the product.

Indeed, the filler acts as a reinforcement and, with the increase of its amount, the mechanical behavior generally changes from ductile to fragile, because of the poor compatibility between filler and matrix at their interface. The filler stiffens the composite but, at the same time, interrupts the continuity of the polymeric matrix which supports the whole structure.

The different inorganic fillers are often subjected to preliminary chemical treatments with the purpose of trying to improve the interaction thereof with the polymeric phase, thus decreasing the unavoidable segregation problems which create in-homogeneity in the final structure of the composite product.

The end result is that the preparation of said composites with a polyurethane, or, generally, polymeric matrix results complex and remarkably expensive.

However, said materials always show a series of drawbacks mainly connected with the unavoidable presence of in-homogeneity within their structure, the poor fire resistance and the plasticizing effects of the polymeric phase due to the interaction with water.

Alternative materials to those described above, having insulation, thermal and acoustic properties and having a good impact strength have been produced by assembling polymeric layers and inorganic layers with different thermal conductivities, kept together through a mechanical bonds system.

These latter materials show, however, drawbacks connected with the thermal expansion incompatibility of the used materials, as well as the assembly process of the same, which in most cases results particularly complex and expensive.

Therefore, there remains the need of providing an alternative material to those known, which has high characteristics of thermal and acoustic insulation, water vapor permeability, fire resistance, lightness, as well as a good adhesiveness to concretes, mortars and plasters and good mechanical resistance to compression, and which does not show, or minimize, the drawbacks above pointed out, typical of the materials currently used in the building field.

An object of the present invention is to provide a solution to the technical need above described.

These and other objects, which will result apparent from the following detailed description, have been attained by the Applicant which has unexpectedly found that, by carrying out the preparation reaction of a foamed polymer (preferably a foamed polyurethane) in the presence of at least one proper inorganic binder, it is possible to obtain a foamed polymer-inorganic binder hybrid material (preferably, a foamed polyurethane-inorganic binder hybrid) having such features to provide an adequate answer to the problems above pointed out.

An object of the present invention is therefore a foamed polymer-inorganic binder hybrid material, whose features are reported in the appended independent claim.

Another object of the present invention is a method for the preparation of the above hybrid material, which features are reported in the appended independent claim.

Another object of the present invention is the use of said hybrid material in the building field, as reported in the appended independent claim.

Preferred embodiments of the present invention are reported in the appended dependent claims.

The present invention is illustrated in detail in the following description. Said invention is further shown also with the help of the enclosed FIGS. 1 to 3, in which.

the microstructure of the foamed polymer, with the bubble walls pointed out (photo on the left, with a lower magnification).

the cell walls, covered by the inorganic phase (photo in the middle, with an intermediate magnification).

the hydrated calcium trisulfoaluminate crystals and the continuous amorphous phase of hydrated calcium silicate, characteristics of the hydrated cement (photo on the right, with a greater magnification).

The present invention then relates to the realization of a novel foamed polymer-inorganic binder hybrid composite material, in which the organic matrix (preferably, of a polyurethane type) and the inorganic binder are intimately interpenetrated, or interconnected, together to give an extremely uniform and homogeneous final structure.

The preparation method of said material (described in detail below) allows at least to minimize, preferably, to substantially eliminate, the drawbacks associated with the known methods for preparing the hybrid polymer-filler and polymer-cement materials of the state of the art.

Differently from the latter materials (in which the filler is only dispersed in the polymer in a non-uniform and inhomogeneous way, thus giving rise to structures in which the constituting phases are not interpenetrated), according to the preparation method of the present invention, the anhydrous and/or hydrated particles of the binder used (for example, cement) strongly result interacting with the polar component of the polymeric structure (namely, for example, the starting polyol used for preparing the foamed polyurethane). Therefore, the foaming process (described below) used for the polymer expansion, allows to obtain an organic-inorganic hybrid material, wherein the inorganic binder phase is finely distributed in a completely homogeneous way within the material itself and intimately interpenetrated between the microparticles of the foamed polymer The resulting structure is therefore characterized by intimately interpenetrated phases therebetween and distributed in a uniform and homogeneous way. Said structural features impart to said material, in an optimal extent, excellent thermal and acoustic insulation properties and, at the same time, ensure a high fire resistance, a high permeability to water vapor, lightness, a high compatibility with any surface finishing layer based on hydraulic and/or air binders, a high resistance to the water action, a high resistance to chemical agents, as well as an optimal compression resistance and impact strength.

Figure 2:
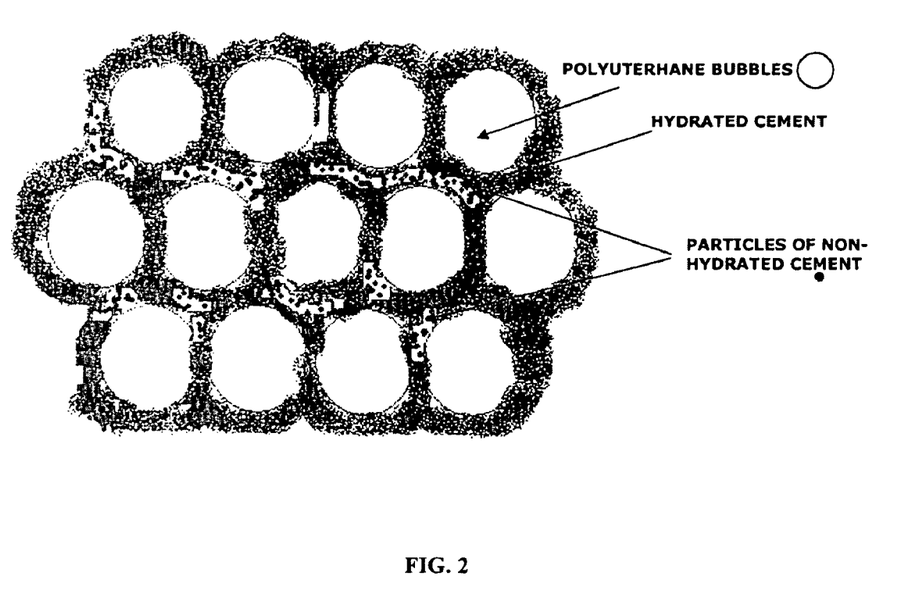
FIG. 2 graphically shows the submicrometer closed-cells structure of a foamed polyurethane-cement according to the present invention; from the drawing, the intimate and complete interpenetration between the cement particles, hydrated or not, and the gas containing-polyurethane bubbles is clearly and unequivocally apparent; the microstructure results extremely uniform and completely free of in-homogeneities.
Figure 3:
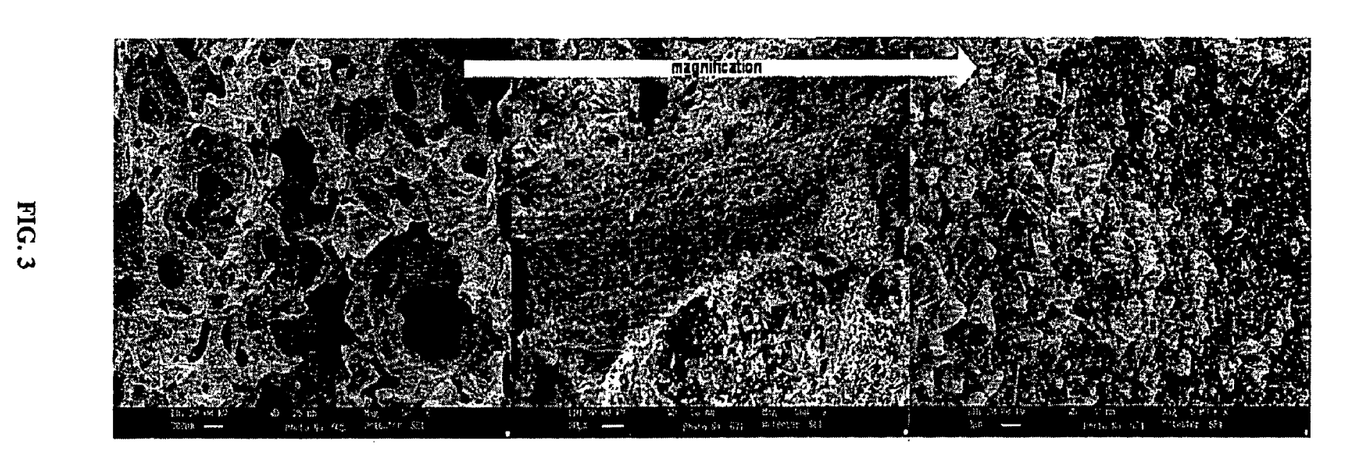
FIG. 3 shows, side by side, three SEM photographs (taken by a Scanning Electron Microscope) of the microstructure of the foamed polyurethane-cement hybrid graphically shown in FIG. 2; the three photographs have been taken at different magnifications and show, respectively.

The present invention then relates to a hybrid material including at least:
a) a first phase, including a foamed polymer;
b) a second phase, including at least one inorganic binder;
c) a third gaseous phase;
characterized in that the structure of said material consists of a co-continuous microstructure (in which by the term "co-continuous microstructure", it is intended a structure in which the phases constituting said structure are intimately interpenetrated, or interconnected, among them, so as to form an extremely regular microstructure, preferably with sub-micrometer dimensions, and completely free of discontinuities in the single phases, as shown by way of example in the enclosed FIGS. 2 and 3).

The hybrid material of the present invention is an organic-inorganic hybrid material.

Preferably, the foamed polymer of the phase a) a polyurethane-based foamed polymer. More preferably, said polymer is a foamed polyurethane, in which the starting polyol may be, if necessary, previously chemically modified, for example with carboxymethyl cellulose, cellulose acetate, cellulose sulfate, trimethylsilylcellulose, hydroxymethyl cellulose and all the cellulose derivatives; for example, 1,3-dimorpholine-2-propanol, N-β-hydroxyethylmorpholine, N-aminopropyl-morpholine, 3,3'-dimorpholine dipropylamine and all the morpholine derivatives; polyethylene glycol, polycaprolactone polyalcohol. Furthermore, the possibility of using alternative sources of polyol, such as for example starch, cellulose, lignin, proteins of a vegetal nature is not excluded.

The inorganic binder of the phase b) is preferably selected from the group including: cement, gypsum, lime, calcium carbonate, cementitious agglomerates or mixtures thereof.

More preferably, said binder is cement.

The gaseous phase of the phase c) generally consists of carbon dioxide, $CO_2$ (usually produced during the formation reaction of the foamed hybrid material). However, it is not excluded that also other gases, such as for example nitrogen, or low boiling organic compounds, such as for example n-pentane, isopentane, cyclopentane, chlorofluorocarbons or water can be used, which, during the polymerization reaction change to the gaseous state due to the exothermic polymerization reaction.

The average dimensions of the co-continuous microstructure of the foamed polymer-inorganic binder hybrid according to the invention are $\leqq 3$-$4\mu$; preferably, said dimensions are $\leqq 3\mu$; more preferably, they are lower than $2\mu$ or even $1\mu$. Preferably, the hybrid material according to this invention further includes at least one additive; more preferably, it includes a mixture of additives.

Said at least one additive (or mixture of additives) is usually utilized during the hybrid preparation for improving the formation reaction thereof and for modulating and/or optimising the desired characteristics thereof.

Preferably, said at least one additive is selected from the group including:

catalysts, such as tertiary amines, for example N,N-dimethylcyclohexylamine, triethylenamine, N,N-dimethyl-2-phenethylamine, N,N-dimethylbenzylamine, 2-dimethylamino-ethanol;

metalorganic salts, such as stannous octoates, sulfur acetate, sulfur octonate, sulfur ethylexoate, sulfur laurate, dibuthyltindilaurate, dibutyl copper ester;

crosslinkers, such as monoethanolamine, diethanolamine, triethanolamine, dimethylcyclohexylamine;

surface-active agents, such as silicone oils, silicones-glycol copolymers, polyether siloxanes, polydimethyl siloxanes, semi-fluorinated block copolymers, such as polymethylmethacrylate-block-(1H,1H,2H,2H perfluoroexylmethacrylate, polymethylmethacrylate-block-(1H,1H,2H,2H perfluorooctilmethacrylate;

foaming agents, such as water, isopentane, cyclopentane, n-pentane, chlorofluorocarbons;

flame retardants and bacteriostatics, such as ammonium polyphosphates, melamines and derivatives;

UV stabilizers;

plasticizers;

compatibilizers;

antistatic agents;

fluidifier, such as naphtalene-sulfonate, melamine sulfide, ligninsulfonate, polystyrene sulfonate, acrylic ester copolymer, glycoside polymers;

additives which show self-cleaning photocatalytic characteristics, such as titanium dioxide, $TiO_2$;

additives which modify the water vapor adsorption properties, such as phosphoric acid.

In the hybrid material according to the present invention:
the foamed polymer is present in a percent quantity between 5% and 80% by weight, based on the total weight of the material;
the inorganic binder is present in a percent quantity between 20% and 90% by weight, based on the total weight of the material;
additives are present in a total percent quantity from 0% to the missing part to 100%, based on the total weight of the material.

Preferably:
the foamed polymer is present in a percent quantity between 10% and 70% by weight, based on the total weight of the material;
the inorganic binder is present in a percent quantity between 30% and 80% by weight, based on the total weight of the material;
additives are present in a total percent quantity from 0% to the missing part to 100%, based on the total weight of the material.

More preferably:

the foamed polymer is present in a percent quantity between 20% and 60% by weight, based on the total weight of the material;

the inorganic binder is present in a percent quantity between 40% and 70% by weight, based on the total weight of the material;

additives are present in a total percent quantity from 0% to the missing part to 100%, based on the total weight of the material.

The general method for the preparation of the hybrid material according to the present invention includes:

a) a first step in which the starting compound/s required for forming the desired foamed polymer (in which said starting compound/s are also additioned with the additives, if any, required for the preparation of said foamed polymer) are mixed with an effective quantity of the desired inorganic binder/s for the time needed for obtaining an intimate mixing of the substances;

b) a second step in which to the above mixture an effective quantity of the polymerising compound/s required for the formation reaction of the polymer is added;

c) a third step in which the mixture of the point b) is left at room temperature for a sufficient time during which the curing reaction of the polymeric phase and the contemporaneous foaming can occur and complete.

Depending on the type of desired hybrid material, it is also possible to invert the order of execution of the above steps a) and b) (namely, by adding the mixture of the step a) to the polymerising compound/s of the step b)).

The mixing of the compounds of the step a) is preferably carried out in a proper mixing equipment. Said equipment can be suitable for the production (both in the factory and in loco) with high or moderate quantities of hybrid material, depending on the requirements.

Said additives needed for the preparation of the desired foamed polymer are, for example, selected from the group above described, including:

catalysts, such as tertiary amines, for example N,N-dimethylcyclohexylamine, triethylenamine, N,N-dimethyl-2-phenethylamine, N,N-dimethylbenzylamine, 2-dimethylamino-ethanol;

metalorganic salts, such as stannous octoates, sulfur acetate, sulfur octanoate, sulfur ethylexoate, sulfur laurate, dibuthyltin dilaurate, dibutylcopper ester;

crosslinkers, such as monoethanolamine, diethanolamine, triethanolamine, dimethylcyclohexylamine;

surface-active agents, such as silicone oils, silicones-glycol copolymers, polyether siloxanes, polydimethyl siloxanes, semi-fluorinated block copolymers, such as polymethylmethacrylate-block-(1H,1H,2H,2H perfluoroexylmethacrylate, polymethylmethacrylate-block-(1H,1H,2H,2H perfluorooctilmethacrylate;

foaming agents, such as water, isopentane, cyclopentane, n-pentane, chlorofluorocarbons;

flame retardants and bacteriostatics, such as ammonium polyphosphates, melamines and derivatives;

UV stabilizers;
plasticizers;
compatibilizers;
antistatic agents;
fluidifier, such as naphtalene-sulfonate, melamine sulfide, ligninsulfonate, polystyrene sulfonate, acrylic ester copolymer, glycoside polymers;

additives which show self-cleaning photocatalytic characteristics, such as titanium dioxide, $TiO_2$;

additives which modify the water vapor adsorption properties, such as the phosphoric acid.

The addition of an effective quantity of at least one compound having a foaming action (or a proper mixture of foaming agents) has proved to be particularly preferred, such as for example: water, isopentane, cyclopentane, n-pentane, chlorofluorocarbons or mixtures thereof.

In a particularly preferred embodiment of the invention, the foamed polymer is a foamed polyurethane including one or more additives, such as for example fluidifier, naphtalenesulfonate, melamine sulfide, ligninsulfonate, polystyrene sulfonate, acrylic ester copolymer, glycoside polymers, additives which show self-cleaning photocatalytic characteristics, such as titanium dioxide, additives which modify the water vapour adsorption properties, such as the phosphoric acid.

When the foamed polymer is a foamed polyurethane, the starting compound to be polymerised is a polyol. In an embodiment of the invention, said polyol is previously chemically modified, for example with carboxymethyl cellulose, cellulose acetate, cellulose sulfate, trimethylsilylcellulose, hydroxymethyl cellulose and all the cellulose derivatives; for example, 1,3-dimorpholine-2-propanol, N-β-hydroxymorpholine, N-aminopropylmorpholine, 3,3'-dimorpholine dipropylamine and all the morpholine derivatives; polyethylene glycol, polycaprolactone polyalcohol. In another embodiment of the invention, said polyol can be replaced by alternative sources of the same, such as for example starch, cellulose, lignin, proteins of a vegetal origin.

Preferably, the polyol is a polyether and/or a polyester.

In turn, the polymerising compound is preferably a di-isocyanate or a di-isocyanate mixture. Preferably, said di-isocyanate can be a MDI (methylene-di-isocyanate) and/or a TDI (toluene-di-isocyanate) and/or a mixture thereof.

The polyol/di-isocyanate combination is properly selected as a function of the end characteristics which one desires to obtain. By way of example, if one wishes to obtain an open cells foamed polymer (namely, a foam in which the gaseous phase is co-continuous) a combination like polyether, such as polyol/TDI, MDI, or a mixture thereof, such as di-isocyanate, is preferably used. If, on the contrary, one wishes to obtain a closed cells foamed polymer (namely a foam in which the gaseous phase is not co-continuous; i.e. in which the gas is present, particularly, in pockets, bubbles enclosed in the solid phase) a combination of polyester, such as polyol/TDI, MDI, or a mixture thereof, such as di-isocyanate, is preferably used.

The expansion degree is in turn modulated by controlling both the quantity and/or the type/s of foaming additive/s added, and the treatment/foaming time of the above step c).

A particularly preferred inorganic binder for the purposes of the present invention is the cement.

In a particularly preferred embodiment of the invention, the preparation method of the hybrid material above described further includes subjecting the binding component of the hybrid material to a hydration step. Preferably, said hydration step is carried out by means of immersion in water of the foamed polymer-inorganic binder hybrid material, for the time required for the obtainment of the desired hydration degree of the inorganic binder. For the obtainment of the desired properties, the components of the hybrid material according to the invention are selected to promote and ensure the continuity of the inorganic phase and an optimal morphology of the foamed phase (pore size distribution and partial interconnection, if any) as a function of the specific application.

Advantageously, because of the hydrophilic chemical nature of the reagents, segregation problems of the cement during the mixing step are avoided, since the same has proved to be compatible with the polymeric reagents used (in particular, it interacts with the hydrophilic residues of the same).

In the following experimental section, the present invention will be described in detail, by mere way of example and absolutely not limiting the wide application potential of the same, with a particular reference to hybrid materials based on foamed polyurethane-cement.

It is understood that the teaching resulting from the description referred to said preferred hybrid materials based on foamed polyurethane-cement can be completely transferred, mutatis mutandis, by a skilled artisan, to other possible utilizable combinations of foamed polymer-inorganic binder in the building field, for the same uses foreseen for foamed polyurethane-cement.

Figure 1:
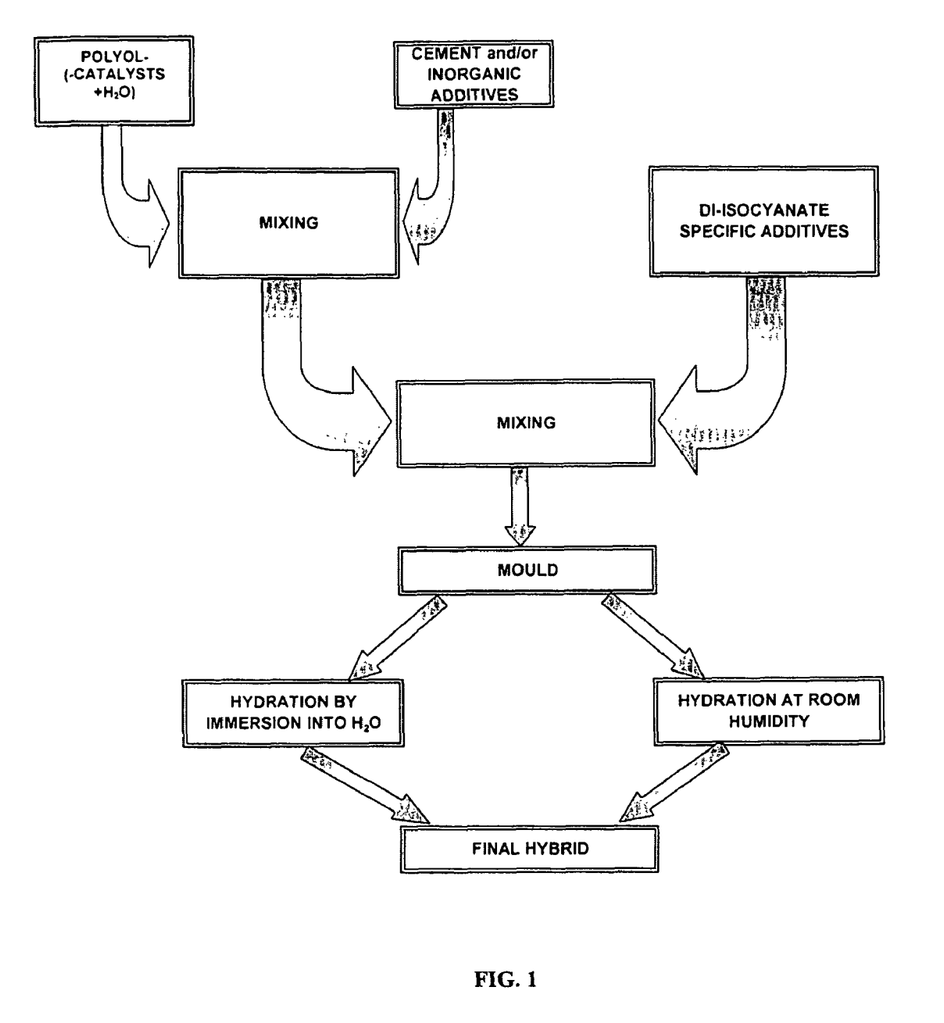
FIG. 1 schematically points out the method for preparing two preferred types of foamed polyurethane-cement hybrid material according to the present invention (respectively, the hybrids of type A1 and A2, described below in the experimental Example 1)

In a particularly preferred embodiment, the invention includes the preparation method of the foamed polyurethane-cement schematized in the enclosed FIG. 1 and described in the following experimental examples: the percentages shown in said examples refer to the fraction by weight based on the starting total mass of the material (namely, the sum of the weights of the starting products).

The following examples have an application valence of a general nature; accordingly, they point out preferred percent ponderal numerical intervals (%) within which the different components can be varied, as a function of the desired features of the end product.

GENERAL EXAMPLE 1

Hybrids Type A1 and A2

The polyol is weighed, for an amount between 20 and 80% by weight, based on the starting total mass, of the hybrid material (including catalyst/s, silicones, surface-active agents and crosslinking agents, flame retardants and bacteriostatics, UV stabilizers, for a total amount by weight between 0 and 10% by weight, based on the polyol; preferably, between 1% and 8%; more preferably, from 2% to 7%); the cement is added, for an amount between 20% and 60% by weight; the foaming agent (previously described), if any, is added for an amount between 0 and 10% by weight, and mixed for about 1-10 minutes, in a HOBART® mixer until a complete and intimate mixing of the components is obtained.

Di-isocyanate is added, for an amount between 10% and 40% by weight, and stirred until a complete homogenization of the mixture, for a sufficiently short time (about 10-120 seconds; preferably for about 20-60 seconds) to avoid an early polymerization of the polyurethane.

The mixture thus obtained is preferably cast in proper aluminium or plastic molds/forms, for example made of polypropylene or polystyrene (or it is directly transferred in the application place) and left to polymerise and foam in air at room temperature. The expansion reaction continues in parallel with the polymerization and the curing of the novel structure. For the purposes of obtaining a composite with a controlled (desired) density, the foaming reaction must occur in closed or partly closed molds; likewise, the reaction can take place in a free foaming in open molds.

The hybrid product obtained as above described is then aged in water or in an environment saturated with water vapor for different times and temperatures, so as to obtain the partly or total hydration of the aluminate (calcium aluminate), and silicate (calcium silicate) phases of the cement. In this way, the inorganic network formation is carried out, which imparts to the composite the typical properties of a cementitious material (stiffness, permeability, interaction with water, etc.). This material has the characteristic of a foamed hybrid constituted by a hydrated cement (or a proper substitute thereof) and a polyurethane. The two phases result intimately interpenetrated and the final characteristics depend on the mass ratio of the constituting materials and the expansion/foaming degree obtained by the material.

For easiness, the hybrid (the hybrids family) obtained by using a typical formulation of the open cells blown foams (for example polyether/MDI) is identified hereinafter as HYBRID TYPE A1.

By using, on the contrary, a typical formulation of the closed cells blown foams (for example polyester/TDI), a hybrid (a hybrids family), for easiness identified hereinafter as HYBRID TYPE A2, is obtained. Some preferred variants of hybrid materials according to the present invention are shown by way of example in the following examples.

EXAMPLE 2

Hybrid Type B

A hybrid material is prepared in the same way described in the general Example 1, but the hydration step of the cement is not carried out.

For easiness, the hybrid thus obtained is identified as HYBRID TYPE B.

EXAMPLE 3

Hybrid Type C

A hybrid material is prepared in the same way described in the general Example 1, but the polyol is previously chemically modified with carboxymethyl cellulose, or cellulose acetate, or cellulose sulfate, or trimethylsilylcellulose.

For easiness, the hybrid (the hybrids family) thus obtained is identified as HYBRID TYPE C.

EXAMPLE 4

Hybrid Type D

A hybrid material is prepared in the same way described in the Example 1, but the polyol used is of a natural origin, for example starch.

For easiness, the hybrid thus obtained is identified as HYBRID TYPE D.

EXAMPLE 5

Hybrid Type E

A hybrid material is prepared in the same way described in the Example 1, but the cement is previously kneaded with water and fluidifier.

For easiness, the hybrid thus obtained is identified as HYBRID TYPE E.

EXAMPLE 6

Hybrid Type F

A hybrid material is prepared in the same way described in the Example 1, but calcium sulfate (gypsum) is used as a binder instead of cement.

For easiness, the hybrid thus obtained is identified as HYBRID TYPE F.

EXAMPLE 7

Hybrid Type G

A hybrid material is prepared in the same way described in the Example 1, but lime is used as a binder instead of cement.

For easiness, the hybrid thus obtained is identified as HYBRID TYPE G.

EXAMPLE 8

Hybrid Type H

A hybrid material is prepared in the same way described in the Example 1, but to the cement titanium dioxide ($TiO_2$) is additioned.

For easiness, the hybrid thus obtained is identified as HYBRID TYPE H.

EXAMPLE 9

Hybrid Type I

A hybrid material is prepared in the same way described in the Example 1, but to the cement phosphoric acid is additioned.

For easiness, the hybrid thus obtained is identified as HYBRID TYPE I.

In order to point out the typical properties and the advantages of the hybrid materials according to the present invention, HYBRID TYPE A1 and A2 systems have been compared with known foamed materials, typically used in the building filed, both with open cells and closed cells.

The main advantages shown by HYBRIDS TYPE A1 and A2 are summarized below.

HYBRID TYPE A1

In comparison with the known open cells foams, charged with inorganic fillers, the HYBRID TYPE A1 has shown:
better mechanical resistances;
better phonoabsorbency;
better adhesive properties to cementitious matrixes;
better flame resistance.

HYBRID TYPE A1

In comparison with the lightweight concretes, obtained by (partly) substitution of the traditional inert material (crushed stone and sand) with a polymeric material, such as foamed polystyrene, the HYBRID TYPE A1 has shown:
better phonoabsorbency;
lower density;
specific mechanical properties;
greater easiness of laying.

HYBRID TYPE A2

In comparison with closed cells foams charged with inorganic fillers, the HYBRID TYPE A2 has shown:
better mechanical resistances;
better water vapor permeability due to the hydrated cement phase;
better adhesive properties with cementitious matrices;
flame resistance.

HYBRID TYPE A2

In comparison with lightweight concretes, obtained by (partly) substitution of the traditional inert material (crushed stone and sand) with a polymeric material, such as foamed polystyrene, the HYBRID TYPE A2 has shown:
better thermal insulation;
better acoustic insulation;
lower density;
specific mechanical properties;
greater easiness of laying.

As for other types of hybrid materials (from B to I) above exemplified, the following characteristics have been pointed out.

The HYBRID TYPE B, in comparison with the traditional polyurethane systems with a non co-continuous structure (both open and closed cells) used in the building sector has shown:
better adhesive properties with cementitious matrices;
better mechanical resistances;
better flame resistance.

The HYBRID TYPE C has a good hydrophilicity degree which makes easy and fast the cement hydration process with respect to HYBRIDS TYPE A.

The HYBRID TYPE D presents a good hydrophilicity degree which makes easy and fast the cement hydration process with respect to HYBRIDS TYPE A and B. This product further shows lower costs.

For the HYBRID TYPE E, the hydration process is made easy and fast.

For the HYBRID TYPE F, the setting and curing processes of the cement (an intrinsic characteristic of sulfates) are accelerated and moreover the water vapor absorption properties are increased.

HYBRID TYPE G shows the typical properties of an air binder (namely of a system which cures in the presence of air, by carbonation from the carbon dioxide).

HYBRID TYPE H shows the "self-cleaning" photocatalytic property, capable of decreasing in a significant way organic and inorganic atmospheric pollutions, by exploiting the degradation reaction of the same started by the sunlight.

HYBRID TYPE I increases the water vapor absorption properties. The hybrid material containing foamed polyurethane-inorganic binder according to the present invention, having an intimately interpenetrated and homogeneous co-continuous microstructure, has proved to be particularly advantageous for a use thereof in the building field, thanks to its advantageous characteristics above mentioned of thermal insulation, acoustic insulation, water vapor permeability, fire resistance, lightness as well as adhesion to concretes, mortars and plasters, and of compression resistance.

The hybrid material obtained through the preparation method previously described shows multiple advantages due to the versatility of its composition and the contribution of the intimately interpenetrated three phases (polymer, inorganic binder, gas) which intervene in the different physical phenomena of, water vapor transport, thermal and acoustic insulation, fire resistance, adhesion and lightness. In particular, the hydrated cement, constituting a co-continuous phase (and not a simple, discontinuous, filler, as in the materials traditionally used) provides the properties of permeability, mechanical stiffness, flame resistance and chemical compatibility with concretes, plasters and mortars. Moreover, the polyurethane phase, provides the foaming support and, together with the gaseous phase, allows a remarkable weight reduction of the end material and imparts the thermal and acoustic insulation properties. Thermal and acoustic insulation properties are optimized by modulating the morphology and the interconnection of the porosity.

Furthermore, the hybrid material according to the present invention shows easiness of setting and processability. The versatility of the innovative material (obtained through the possibility of modulating cell compositions and morphologies) allows to obtain an optimized system as a function of the final application. The present invention therefore relates to the realization and the use, mainly in the civil-housing sector, of materials which contemporaneously present both the properties of a cellular concrete (permeability, lightness, good compression mechanical resistances, fire resistance, good compatibility with mortars, plasters and concretes), and of a polymeric foam (acoustic and thermal insulation, easiness of setting and processability). The setting easiness of the material is reflected in the possibility of producing panels or intermediate materials in the factory, to be successively mounted in the building yard, or to produce the material directly in the building yard, with the possibility, in this latter case, of directly filling cavities with non planar geometries, spraying the mixture in situ or casting the same in forms. Furthermore, this material can be applied as a reinforcement of infrastructures and soils, by injection. In all these applications, in comparison with the foamed polyurethane as such, this material shows the characteristic of being more inert from the chemical point of view, because of the presence of the cementitious hydrated inorganic phase from which results a greater stability over time and a better compatibility with soils and infrastructures.

The invention claimed is:

1. A hybrid structurally co-continuous and interpenetrated material including at least:
   a) a first phase, including a foamed polymer;
   b) a second phase, including at least one hydrated inorganic binder.

2. A method for the preparation of a material according to claim 1, including the steps of:
   a) mixing the starting compound(s) required for forming the desired polymer with the inorganic binder(s);
   b) adding the polymerizing compound(s), required for the formation reaction of the polymer, to the mixture of point (a);
   c) curing and contemporaneously foaming the polymeric phase of the mixture of step (b); and
   d) hydrating the cured and foamed mixture of step (c).

3. The method according to claim 2, wherein the starting compound of step a) is a polyol.

4. The method according to claim 3, wherein the polyol is chemically modified with carboxymethyl cellulose, cellulose acetate, cellulose sulfate, trimethylsilylcellulose, hydroxymethyl cellulose, 1,3-dimorpholine-2-propanol, N-β-hydroxymorpholine, N-aminopropylmorpholine, 3,3'-dimorpholine dipropylamine, polyethylene glycol, or polycaprolactone polyalcohol.

5. The method according to claim 3, wherein the polyol is a polyether and/or a polyester.

6. The method according to claim 2, wherein the starting compound(s) of step (a) is (are) further added with at least an additive selected from the group consisting of:
   a catalyst selected from the group consisting of: tertiary amines, N,N-dimethylcyclohexylamine, triethylenamine, N,N-dimethyl-2-phenethylamine, N,N-dimethylbenzylamine, and 2-dimethylamino-ethanol;
   a metalorganic salt selected from the group consisting of: stannous octoates, sulfur acetate, sulfur octanoate, sulfur ethylexoate, sulfur laurate, dibuthyltindilaurate, and dibutyl copper ester;
   a crosslinker selected from the group consisting of: monoethanolamine, diethanolamine, triethanolamine, and dimethylcyclohexylamine;
   a surface-active agent selected from the group consisting of: silicone oils, silicones-glycol copolymers, polyether siloxanes, polydimethyl siloxanes, and semi-fluorinated block copolymers selected from the group consisting of: polymethylmethacrylate-block-(1H,1H,2H,2H perfluoroexylmethacrylate), and polymethylmethacrylate-block-(1H,1H,2H,2H perfluorooctylmethacrylate);
   a foaming agent selected from the group consisting of: water, isopentane, cyclopentane, n-pentane, and chlorofluorocarbons;
   a flame retardant and/or a bacteriostatic selected from the group consisting of: ammonium polyphosphates, melamines and derivatives thereof;
   a UV stabilizer;
   a plasticizer;
   a compatibilizer;
   an antistatic agent;
   a fluidifier selected from the group consisting of: naphtalene-sulfonate, melamine sulfonate, ligninsulfonate, polystyrene sulfonate, acrylic ester copolymer, and glycoside polymers;
   an additive which shows self-cleaning photocatalytic characteristics; and
   an additive which modifies water vapour adsorption properties.

7. The method according to claim 6, wherein the additive showing self-cleaning photocatalytic characteristics is titanium dioxide ($TiO_2$).

8. The method according to claim 6, wherein the additive which modifies the water vapour adsorption properties is phosphoric acid.

9. The method according to claim 2, wherein the polymerising compound of step b) is a di-isocyanate.

10. The method according to claim 9, wherein the di-isocyanate is methylene di-isocyanate or toluene di-isocyanate or a mixture thereof.

11. The method according to claim 2, wherein the inorganic binder is cement.

12. The method according to claim 2, wherein step c) takes place at room temperature.

13. The method according to claim 2, wherein the hydration phase of step d) is carried out by ageing the product from step c) in water or in an environment saturated with water vapor.

14. The material according to claim 1, wherein said foamed polymer is a polyurethane based-polymer.

15. The material according to claim 14, wherein the foamed polymer is a polyurethane.

16. The material according to claim 1, further including at least one additive selected from the group consisting of:
   a catalyst selected from the group consisting of: tertiary amines, N,N-dimethylcyclohexylamine, triethylenamine, N,N-dimethyl-2-phenethylamine, N,N-dimethylbenzylamine, and 2-dimethylamino-ethanol;
   a metalorganic salt selected from the group consisting of: stannous octoates, sulfur acetate, sulfur octanoate, sulfur ethylexoate, sulfur laurate, dibuthyltindilaurate, and dibutyl copper ester;
   a crosslinker selected from the group consisting of: monoethanolamine, diethanolamine, triethanolamine, and dimethylcyclohexylamine;
   a surface-active agent selected from the group consisting of: silicone oils, silicones-glycol copolymers, polyether siloxanes, polydimethyl siloxanes, and semi-fluorinated block copolymers, selected from the group consisting of: polymethylmethacrylate-block-(1H,1H,2H,2H perfluoroexylmethacrylate), and polymethylmethacrylate-block-(1H,1H,2H,2H perfluorooctylmethacrylate);

a foaming agent selected from the group consisting of: water, isopentane, cyclopentane, n-pentane, and chlorofluorocarbons;

a flame retardant and/or a bacteriostatic selected from the group consisting of: ammonium polyphosphates, melamines and derivatives thereof;

a UV stabilizer;

a plasticizer;

a compatibilizer;

an antistatic agent;

a fluidifier selected from the group consisting of: naphtalene-sulfonate, melamine sulfonate, ligninsulfonate, polystyrene sulfonate, acrylic ester copolymer, and glycoside polymers;

an additive which shows self-cleaning photocatalytic characteristics; and an additive which modifies water vapour adsorption properties.

17. The material according to claim 16, wherein the additive showing self-cleaning photocatalytic characteristics is titanium dioxide ($TiO_2$).

18. The material according to claim 16, wherein the additive modifying the water vapour adsorption properties is phosphoric acid.

19. The material according to claim 1, wherein:

the foamed polymer is present in a percent quantity comprised from 5% to 80% by weight, based on the total weight of the material;

the binder is present in a percent quantity comprised from 20% to 90% by weight, based on the total weight of the material;

additives are present in a total percent quantity comprised from 0% to the missing part to 75%, based on the total weight of the material.

20. The material according to claim 19, wherein:

the foamed polymer is present in a percent quantity comprised from 10% to 70% by weight, based on the total weight of the material;

the binder is present in a percent quantity comprised from 30% to 80% by weight, based on the total weight of the material;

additives are present in a total percent quantity comprised from 0% to the missing part to 60%, based on the total weight of the material.

21. The material according to claim 1, wherein said inorganic binder is cement.

22. The material according to claim 1, wherein:

the foamed polymer is a foamed polyurethane and the inorganic binder is hydrated cement.

23. A method of building a building, comprising the steps of providing a hybrid material according to claim 1, and incorporating said material into said building.

* * * * *